(12) United States Patent
Hsu et al.

(10) Patent No.: US 9,124,452 B2
(45) Date of Patent: Sep. 1, 2015

(54) APPARATUS AND METHOD FOR ITERATIVE INTERFERENCE CANCELLATION IN A WIRELESS COMMUNICATION NETWORK

(71) Applicant: QUALCOMM Incorporated, San Diego, CA (US)

(72) Inventors: Chun-Hao Hsu, San Jose, CA (US); Aditya Dua, San Jose, CA (US); Nathan Dingsai Yee, Saratoga, CA (US); Abhinav Gupta, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 13/738,365

(22) Filed: Jan. 10, 2013

(65) Prior Publication Data

US 2014/0192853 A1      Jul. 10, 2014

(51) Int. Cl.
| | |
|---|---|
| H04B 1/10 | (2006.01) |
| H04L 27/01 | (2006.01) |
| H04B 1/7075 | (2011.01) |
| H04B 1/7107 | (2011.01) |
| H04B 1/7115 | (2011.01) |

(52) U.S. Cl.
CPC ............ *H04L 27/01* (2013.01); *H04B 1/70754* (2013.01); *H04B 1/7107* (2013.01); *H04B 1/7115* (2013.01); *H04B 2201/70722* (2013.01); *H04B 2201/70724* (2013.01)

(58) Field of Classification Search
CPC ..................................................... H04L 5/023
See application file for complete search history.

(56) References Cited

U.S. PATENT DOCUMENTS

| | | | |
|---|---|---|---|
| 7,912,118 B2 | 3/2011 | Wang et al. | |
| 8,208,856 B2 | 6/2012 | Hahm et al. | |
| 2005/0063500 A1* | 3/2005 | Li et al. ......................... | 375/350 |
| 2007/0025434 A1 | 2/2007 | Sternberg et al. | |
| 2007/0171960 A1 | 7/2007 | Zhang et al. | |
| 2008/0310485 A1* | 12/2008 | Soliman et al. ............... | 375/147 |
| 2011/0069736 A1 | 3/2011 | Coralli et al. | |
| 2012/0108175 A1 | 5/2012 | Luo et al. | |
| 2012/0183088 A1 | 7/2012 | Liao et al. | |

FOREIGN PATENT DOCUMENTS

| | | |
|---|---|---|
| EP | 1976138 A2 | 10/2008 |
| EP | 2173046 A1 | 4/2010 |
| WO | 2005009057 A2 | 1/2005 |

OTHER PUBLICATIONS

International Search Report and Written Opinion—PCT/US2013/053484—ISA/EPO—Oct. 21, 2013.

* cited by examiner

*Primary Examiner* — Tanmay Shah
(74) *Attorney, Agent, or Firm* — Charles E. Eggers

(57) ABSTRACT

One or more aspects of the disclosure provide an efficient equalization scheme capable of mitigating multi-path interference on channels with large delay spread using short-length equalizers. That is, by dividing stored samples of a signal received on the multi-path channel by time into a plurality of clusters, a short-length equalizer can be utilized in an iterative fashion on each of the clusters, thus eliminating the need for a large length equalizer while still providing improved performance over that of a Rake receiver at large delay spreads. Other aspects, embodiments, and features are also claimed and described.

15 Claims, 10 Drawing Sheets

APPARATUS AND METHOD FOR ITERATIVE INTERFERENCE CANCELLATION IN A WIRELESS COMMUNICATION NETWORK

TECHNICAL FIELD

Aspects of the present disclosure relate generally to wireless communication systems, and more particularly, to receivers configured for interference cancellation in wireless communication networks.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

In these systems, the RF performance at the access terminal is a key feature for which further optimization is continuously sought. Thus, many variations of receivers have been developed, and can provide excellent RF performance for wireless access terminals.

One of many issues with which designers of RF receivers are faced is interference. For example, in any multiple access system such as a cellular communication network, interference caused by wireless communication with other users in the network can inhibit the receiver's performance. Furthermore, by virtue of multipath fading, interference from the desired signal itself, which can be smeared over time by the channel before arriving at the receiver, can additionally inhibit the receiver's performance. Because different types of receiver can better address different types of interference, some access terminals have been known to include more than one type of receiver, or in other examples, two or more functional blocks may be included within a receiver, such as its front-end or back-end. In this way, selection of a more suitable receiver, or a more suitable functional block, may be made in an effort to improve the overall performance of the receiver.

As the demand for mobile broadband access continues to increase, research and development continue to advance the technology not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One or more aspects of the disclosure provide an efficient equalization scheme capable of mitigating multi-path interference on channels with large delay spread using short-length equalizers. That is, by dividing stored samples of a signal received on the multi-path channel by time into a plurality of clusters, a short-length equalizer can be utilized in an iterative fashion on each of the clusters, thus eliminating the need for a large length equalizer while still providing improved performance over that of a Rake receiver at large delay spreads.

In one aspect, the disclosure provides a receiver configured for wireless communication, including a memory configured for storing samples of a received signal, and an equalization filter for filtering at least a portion of the stored samples of the received signal in accordance with a separation of the received signal into a plurality of clusters, each cluster corresponding to a plurality of paths of a multipath channel experienced by the received signal from a source.

In another aspect, the disclosure provides a method of wireless communication, including the steps of receiving a signal corresponding to a transmission from a source, separating the received signal into a plurality of clusters, each cluster corresponding to a plurality of paths of a multipath channel experienced by the received signal from the source, configuring an equalization filter in accordance with the clusters, such that an equalization filter length of the equalization filter corresponds to a width of at least one of the plurality of clusters, and processing the received signal by applying the equalization filter to each of the plurality of clusters.

In another aspect, the disclosure provides a receiver configured for wireless communication, including means for storing samples of a received signal, and means for filtering at least a portion of the stored samples of the received signal in accordance with a separation of the received signal into a plurality of clusters, each cluster corresponding to a plurality of paths of a multipath channel experienced by the received signal from a source.

In another aspect, the disclosure provides a method of wireless communication, including means for receiving a signal corresponding to a transmission from a source, means for separating the received signal into a plurality of clusters, each cluster corresponding to a plurality of paths of a multipath channel experienced by the received signal from the source, means for configuring an equalization filter in accordance with the clusters, such that an equalization filter length of the equalization filter corresponds to a width of at least one of the plurality of clusters, and means for processing the received signal by applying the equalization filter to each of the plurality of clusters.

In another aspect, the disclosure provides a computer-readable storage medium operable at a receiving device, comprising instructions for causing a computer to store samples of a received signal, and to filter at least a portion of the stored samples of the received signal in accordance with a separation of the received signal into a plurality of clusters, each cluster corresponding to a plurality of paths of a multipath channel experienced by the received signal from a source.

In another aspect, the disclosure provides a computer-readable storage medium comprising instructions for causing a computer to receive a signal corresponding to a transmission from a source, to separate the received signal into a plurality of clusters, each cluster corresponding to a plurality of paths of a multipath channel experienced by the received signal from the source, to configure an equalization filter in accordance with the clusters, such that an equalization filter length of the equalization filter corresponds to a width of at least one of the plurality of clusters, and to process the received signal by applying the equalization filter to each of the plurality of clusters.

In another aspect, the disclosure provides a receiver configured for wireless communication, comprising at least one processor, a memory communicatively coupled to the at least one processor, and a communication interface communicatively coupled to the at least one processor, wherein the at least one processor is configured to receive a signal corresponding to a transmission from a source, to separate the received signal into a plurality of clusters, each cluster corresponding to a plurality of paths of a multipath channel experienced by the received signal from the source, to configure an equalization filter in accordance with the clusters, such that an equalization filter length of the equalization filter corresponds to a width of at least one of the plurality of clusters, and to process the received signal by applying the equalization filter to each of the plurality of clusters.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
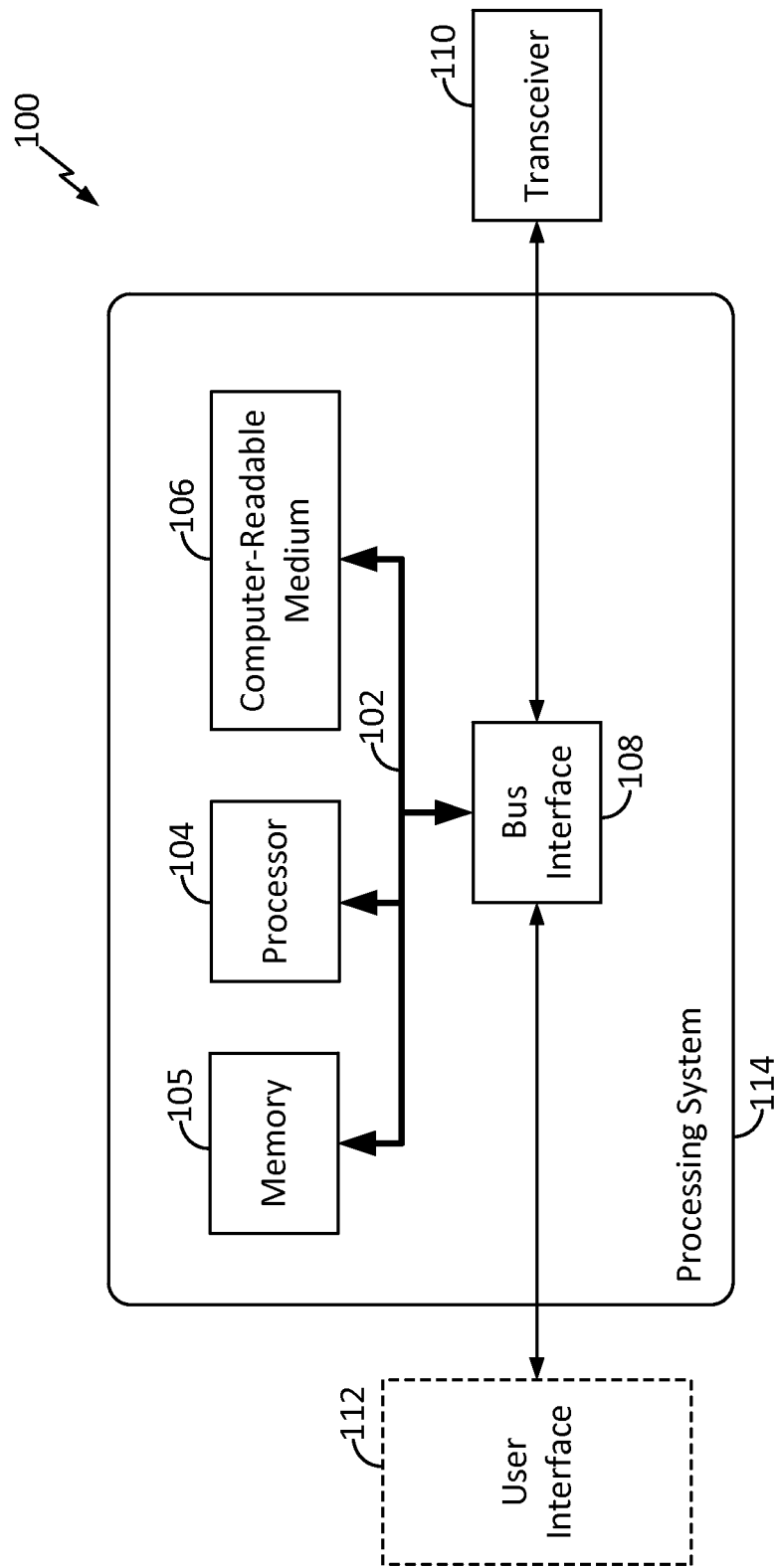
FIG. 1 is a block diagram illustrating an example of a hardware implementation for an apparatus employing a processing system.

FIG. 1 is a conceptual diagram illustrating an example of a hardware implementation for an apparatus 100 employing a processing system 114. For example, the apparatus 100 may be a mobile user equipment (UE) configured for wireless communication in a suitable wireless communication network. In accordance with various aspects of the disclosure, an element, or any portion of an element, or any combination of elements within an apparatus 100 may be implemented with a processing system 114 that includes one or more processors 104. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 2:
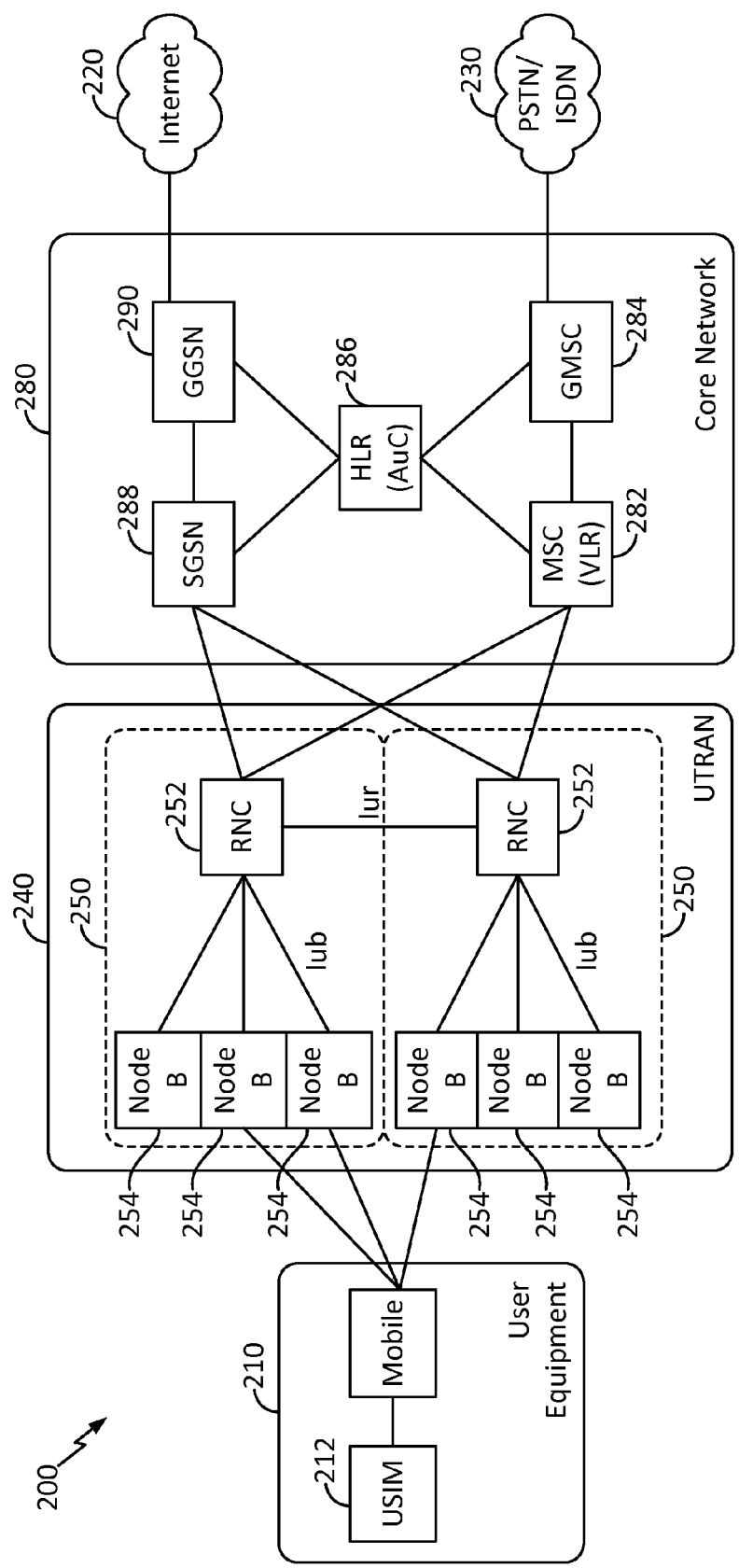
FIG. 2 is a block diagram conceptually illustrating an example of a telecommunications system.

The various concepts presented throughout this disclosure may be implemented across a broad variety of telecommunication systems, network architectures, and communication standards. Referring now to FIG. 2, as an illustrative example without limitation, various aspects of the present disclosure are illustrated with reference to a Universal Mobile Telecommunications System (UMTS) system 200. A UMTS network includes three interacting domains: a core network 280, a radio access network (RAN) (e.g., a UMTS Terrestrial Radio Access Network (UTRAN) 240), and a user equipment (UE) 210. Among several options available for a UTRAN 240, in this example, the illustrated UTRAN 240 may employ a W-CDMA air interface for enabling various wireless services including telephony, video, data, messaging, broadcasts, and/or other services. The UTRAN 240 may include a plurality of Radio Network Subsystems (RNSs) such as an RNS 250, each controlled by a respective Radio Network Controller (RNC) such as an RNC 252. Here, the UTRAN 240 may include any number of RNCs 252 and RNSs 250 in addition to the illustrated RNCs 252 and RNSs 250. The RNC 252 is an apparatus responsible for, among other things, assigning, reconfiguring, and releasing radio resources within the RNS 250. The RNC 252 may be interconnected to other RNCs (not shown) in the UTRAN 240 through various types of interfaces such as a direct physical connection, a virtual network, or the like using any suitable transport network.

The geographic region covered by the RNS 250 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 254 are shown in each RNS 250; however, the RNSs 250 may include any number of wireless Node Bs. The Node Bs 254 provide wireless access points to a core network for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 212, which contains a user's subscription information to a network. For illustrative purposes, one UE 210 is shown in communication with a number of the Node Bs 254. The downlink (DL), also called the forward link, refers to the communication link from a Node B 254 to a UE 210 and the uplink (UL), also called the reverse link, refers to the communication link from a UE 210 to a Node B 254.

The core network 280 can interface with one or more access networks, such as the UTRAN 240. As shown, the core network 280 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 280 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 280 supports circuit-switched services with a MSC 282 and a GMSC 284. In some applications, the GMSC 284 may be referred to as a media gateway (MGW). One or more RNCs, such as the RNC 252, may be connected to the MSC 282. The MSC 282 is an apparatus that controls call setup, call routing, and UE mobility functions. The MSC 282 also includes a visitor location register (VLR) that contains subscriber-related information for the duration that a UE is in the coverage area of the MSC 282. The GMSC 284 provides a gateway through the MSC 282 for the UE to access a circuit-switched network 230. The GMSC 284 includes a home location register (HLR) 286 containing subscriber data, such as the data reflecting the details of the services to which a particular user has subscribed. The HLR is also associated with an authentication center (AuC) that contains subscriber-specific authentication data. When a call is received for a particular UE, the GMSC 284 queries the HLR 286 to determine the UE's location and forwards the call to the particular MSC serving that location.

The illustrated core network 280 also supports packet-switched data services with a serving GPRS support node (SGSN) 288 and a gateway GPRS support node (GGSN) 290. General Packet Radio Service (GPRS) is designed to provide packet-data services at speeds higher than those available with standard circuit-switched data services. The GGSN 290 provides a connection for the UTRAN 240 to a packet-based network 220. The packet-based network 220 may be the Internet, a private data network, or some other suitable packet-based network. The primary function of the GGSN 290 is to provide the UEs 210 with packet-based network connectivity. Data packets may be transferred between the GGSN 290 and the UEs 210 through the SGSN 288, which performs primarily the same functions in the packet-based domain as the MSC 282 performs in the circuit-switched domain.

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 240 is based on such DS-CDMA technology and additionally calls for a frequency division duplexing (FDD). FDD uses a different carrier frequency for the uplink (UL) and downlink (DL) between a Node B 254 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

Figure 3:
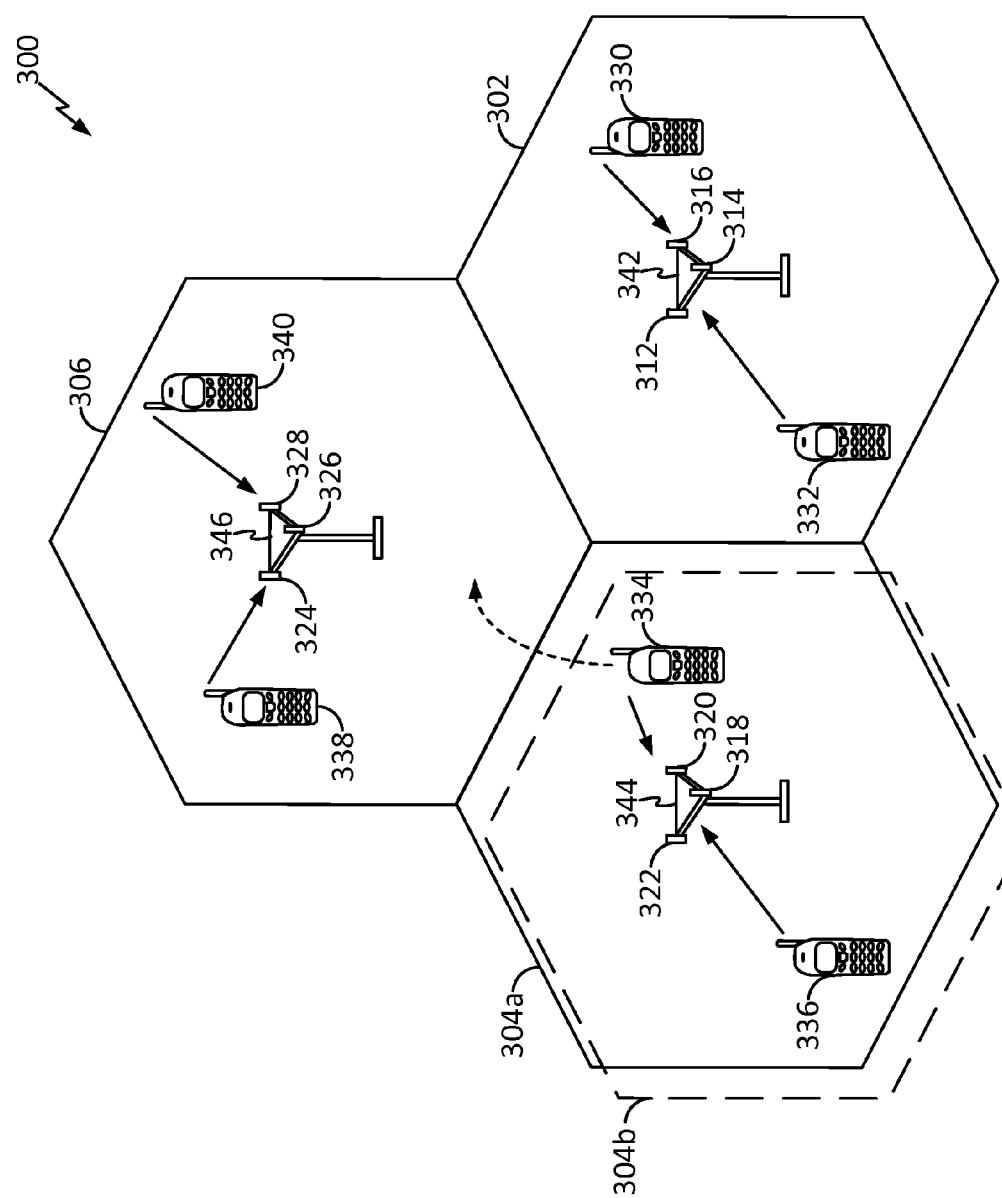
FIG. 3 is a conceptual diagram illustrating an example of an access network.

The UTRAN 240 is one example of a RAN that may be utilized in accordance with the present disclosure. Referring to FIG. 3, by way of example and without limitation, a simplified schematic illustration of a RAN 300 in a UTRAN architecture is illustrated. The system includes multiple cellular regions (cells), including cells 302, 304, and 306, each of which may include one or more sectors. Cells may be defined geographically (e.g., by coverage area) and/or may be defined in accordance with a frequency, scrambling code, etc. That is, the illustrated geographically-defined cells 302, 304, and 306 may each be further divided into a plurality of cells, e.g., by utilizing different scrambling codes. For example, cell 304a may utilize a first scrambling code, and cell 304b, while in the same geographic region and served by the same Node B 344, may be distinguished by utilizing a second scrambling code.

In a cell that is divided into sectors, the multiple sectors within a cell can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 may each correspond to a different sector. In cell 306, antenna groups 324, 326, and 328 may each correspond to a different sector.

The cells 302, 304, and 306 may include several UEs that may be in communication with one or more sectors of each cell 302, 304, or 306. For example, UEs 330 and 332 may be in communication with Node B 342, UEs 334 and 336 may be in communication with Node B 344, and UEs 338 and 340 may be in communication with Node B 346. Here, each Node B 342, 344, and 346 may be configured to provide an access point to a core network 280 (see FIG. 2) for all the UEs 330, 332, 334, 336, 338, and 340 in the respective cells 302, 304, and 306.

During a call with a source cell, or at any other time, the UE 336 may monitor various parameters of the source cell as well as various parameters of neighboring cells. Further, depending on the quality of these parameters, the UE 336 may maintain communication with one or more of the neighboring cells. During this time, the UE 336 may maintain an Active Set, that is, a list of cells to which the UE 336 is simultaneously connected (i.e., the UTRAN cells that are currently assigning a downlink dedicated physical channel DPCH or fractional downlink dedicated physical channel F-DPCH to the UE 336 may constitute the Active Set).

Referring once again to FIG. 2, a high speed packet access (HSPA) air interface includes a series of enhancements to the 3G/W-CDMA air interface between the UE 210 and the UTRAN 240, facilitating greater throughput and reduced latency for users. Among other modifications over prior standards, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink or EUL).

For example, in Release 5 of the 3GPP family of standards, HSDPA was introduced. HSDPA utilizes as its transport channel the high-speed downlink shared channel (HS-DSCH), which may be shared by several UEs. The HS-DSCH is implemented by three physical channels: the high-speed physical downlink shared channel (HS-PDSCH), the high-speed shared control channel (HS-SCCH), and the high-speed dedicated physical control channel (HS-DPCCH).

The HS-SCCH is a physical channel that may be utilized to carry downlink control information related to the transmission of HS-DSCH. Here, the HS-DSCH may be associated with one or more HS-SCCH. The UE may continuously monitor the HS-SCCH to determine when to read its data from the HS-DSCH and to determine the modulation scheme used on the assigned physical channel.

The HS-PDSCH is a physical channel that may be shared by several UEs and may carry downlink data for the high-speed downlink. The HS-PDSCH may support quadrature phase shift keying (QPSK), 16-quadrature amplitude modulation (16-QAM), 64-quadrature amplitude modulation (64-QAM), and multi-code transmission.

The HS-DPCCH is an uplink physical channel that may carry feedback from the UE to assist the Node B in its scheduling algorithm. The feedback may include a channel quality indicator (CQI) and a positive or negative acknowledgement (ACK/NAK) of a previous HS-DSCH transmission.

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). Referring to FIG. 2, the NAS provides the upper layers for signaling between a UE such as the UE 210 and a core network such as the core network 280, and may include circuit switched and packet switched protocols. The AS provides the lower layers for signaling between a UTRAN such as the UTRAN 240 and the UE, and may include a user plane and a control plane. Here, the user plane or data plane carries user traffic, while the control plane carries control information (i.e., signaling).

Figure 4:
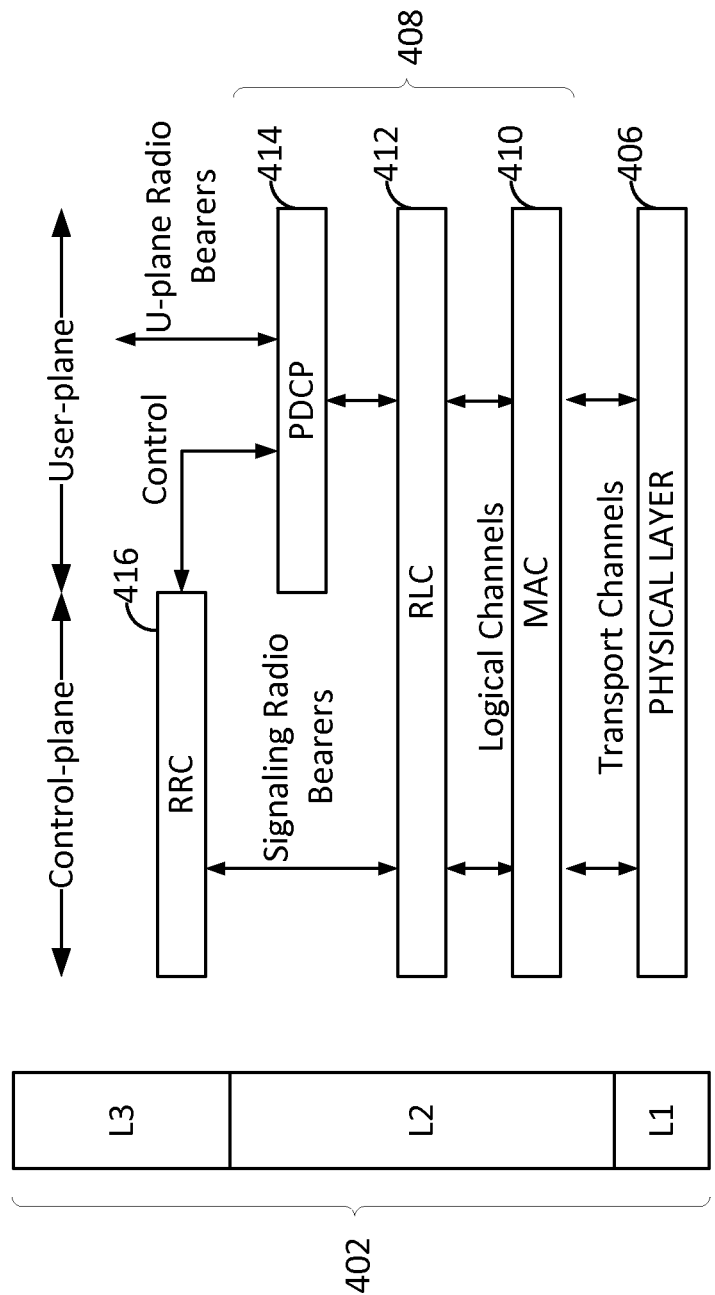
FIG. 4 is a block diagram illustrating a radio protocol architecture for the user and control plane.

Turning to FIG. 4, an AS 402 is shown with three layers: Layer 1, Layer 2, and Layer 3. Layer 1 is the lowest layer and implements various physical layer signal processing functions. Layer 1 will be referred to herein as the physical layer 406. The data link layer, referred to herein as Layer 2 408, is above the physical layer 406 and is responsible for the link between the UE and the Node B over the physical layer 406. At Layer 3, an RRC layer 416 handles the control plane signaling between the UE and the Node B. RRC layer 416 includes a number of functional entities for routing higher layer messages, handling broadcasting and paging functions, establishing and configuring radio bearers, etc.

In the illustrated air interface, the L2 layer 408 is split into various sublayers. In the control plane, the Layer 2 layer 408 includes two sublayers: a medium access control (MAC) sublayer 410 and a radio link control (RLC) sublayer 412. In the user plane, the Layer 2 layer 408 additionally includes a packet data convergence protocol (PDCP) sublayer 414. Although not shown, the UE may have several upper layers above the Layer 2 layer 408 including a network layer (e.g., IP layer) that is terminated at a PDN gateway on the network side and an application layer that is terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between Node Bs.

The RLC sublayer 412 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations.

Figure 5:
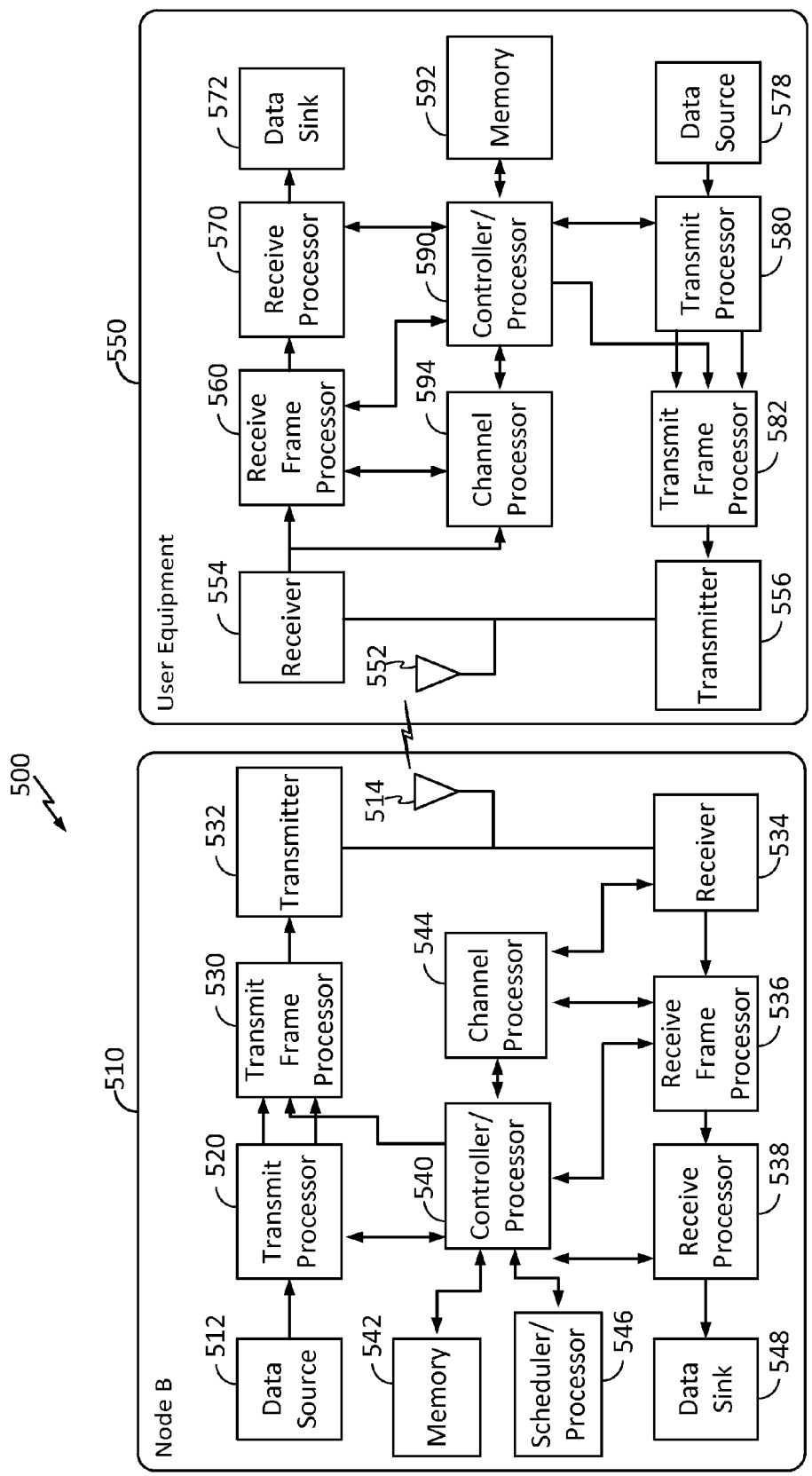
FIG. 5 is a block diagram conceptually illustrating an example of a Node B in communication with a UE in a telecommunications system.

FIG. 5 is a block diagram of an exemplary Node B 510 in communication with an exemplary UE 550 in accordance with one or more aspects of the disclosure, wherein the Node B 510 may be the Node B 254 in FIG. 2, and the UE 550 may be the UE 210 in FIG. 2. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 514. The antenna 514 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 534 receives the uplink transmission through the antenna 514 and processes the transmission to recover the information modulated onto the carrier. The information recovered by the receiver 534 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 548 and the controller/processor 540, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

In any wireless communication network, the downlink signal transmitted from a base station such as the Node B 510 and received by a mobile access terminal such as the UE 550 can usually be represented as the desired signal convolved with a multi-path channel, plus noise and interference from other sources. Without being properly addressed, the multi-path characteristic of the downlink channel can cause severe inter-symbol-interference to the signal, and can accordingly prevent the UE 550 from achieving a high data rate. Thus, various techniques may be implemented at the receiver 554 within the UE 550 to mitigate multipath signal degradation.

For example, some receivers implement equalization for mitigating such degradation on the multi-path channel. Among various known equalization schemes, the linear minimum mean squared error (LMMSE) equalization scheme is well-adopted due to its low implementation complexity and satisfactory performance. In the LMMSE scheme, the received samples are linearly combined or filtered by an equalizer to remove inter-symbol-interference caused by the multi-path channel.

The implementation complexity of the LMMSE equalizer, or that of any more advanced interference cancellation and equalization schemes including the LMMSE equalizer as a part therein, depends on the budgeted equalization filter length. However, an equalizer with insufficient equalization filter length can perform poorly on channels with a large delay spread, which are commonly observed on networks with repeaters. Here, budgeting the equalizer length for those channels with large delay spread can require prohibitively high implementation complexity, and can be wasteful on networks without repeaters.

Figure 6:
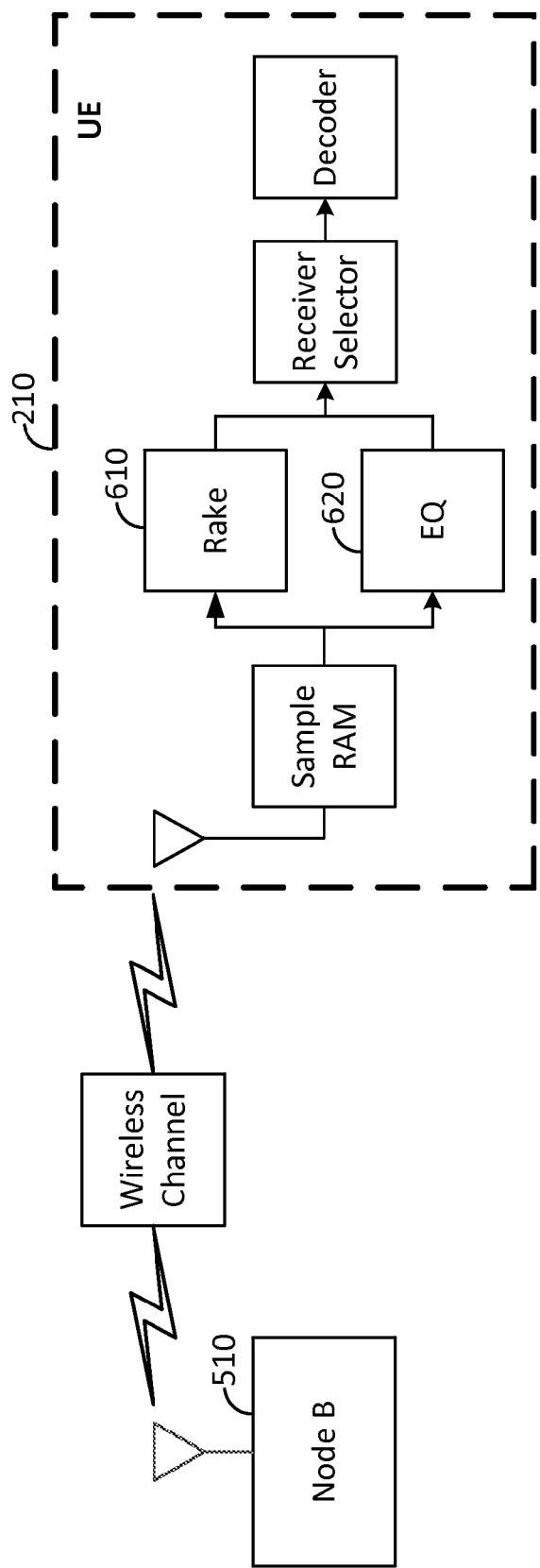
FIG. 6 is a block diagram illustrating a conventional receiver architecture that may be utilized in a UE.

Because of this relatively poor performance scenario for an equalizer of reasonable complexity when the channel has a relatively large delay spread, some conventional receivers may utilize the equalizer only when the delay spread is relatively small, and switch to a Rake receiver when the delay spread is large. FIG. 6 is a simplified block diagram illustrating a conventional receiver architecture including a Rake receiver 610 and an equalizer block 620 for interference cancellation and equalization. With the Rake receiver 610 having N fingers covering a sufficiently long channel impulse response, the reception of a downlink on a multi-path channel with a large delay spread can be improved. That is, the performance of the Rake receiver 610 is relatively constant as a function of the delay spread, while the equalizer block 620 provides a performance that, while better than that of the Rake receiver 610 at low delay spread, is lesser than that of the Rake receiver 610 as the delay spread increases above a certain threshold. However, the addition of the Rake receiver 610 itself results in additional complexity at the receiver circuit, and further, the selection between the Rake receiver 610 and the equalizer 620 may be inefficient and require additional computational power. Therefore, in accordance with one or more aspects of the disclosure, receiver architectures and methods of utilizing equalizers are provided that need not include a large equalizer filter length for equalizing all the paths on the spectrum, and further, need not implement a Rake receiver to handle channels with a large delay spread.

For example, in one aspect of the disclosure, a signal received after it travels through a multipath channel can be divided into a plurality of clusters of relatively small lengths, and an equalizer circuit with a relatively small filter length (e.g., which need not exceed the delay spread of an individual cluster) can iteratively process each cluster. In this way, inter-cluster interference cancellation can be utilized to cancel out self-interference (i.e., interference caused by the same signal as it travels over multiple physical channel paths), enabling improved performance relative to either a conventional equalizer, a Rake receiver, or a receiver that switches between the two as illustrated in FIG. 6.

Figure 7:
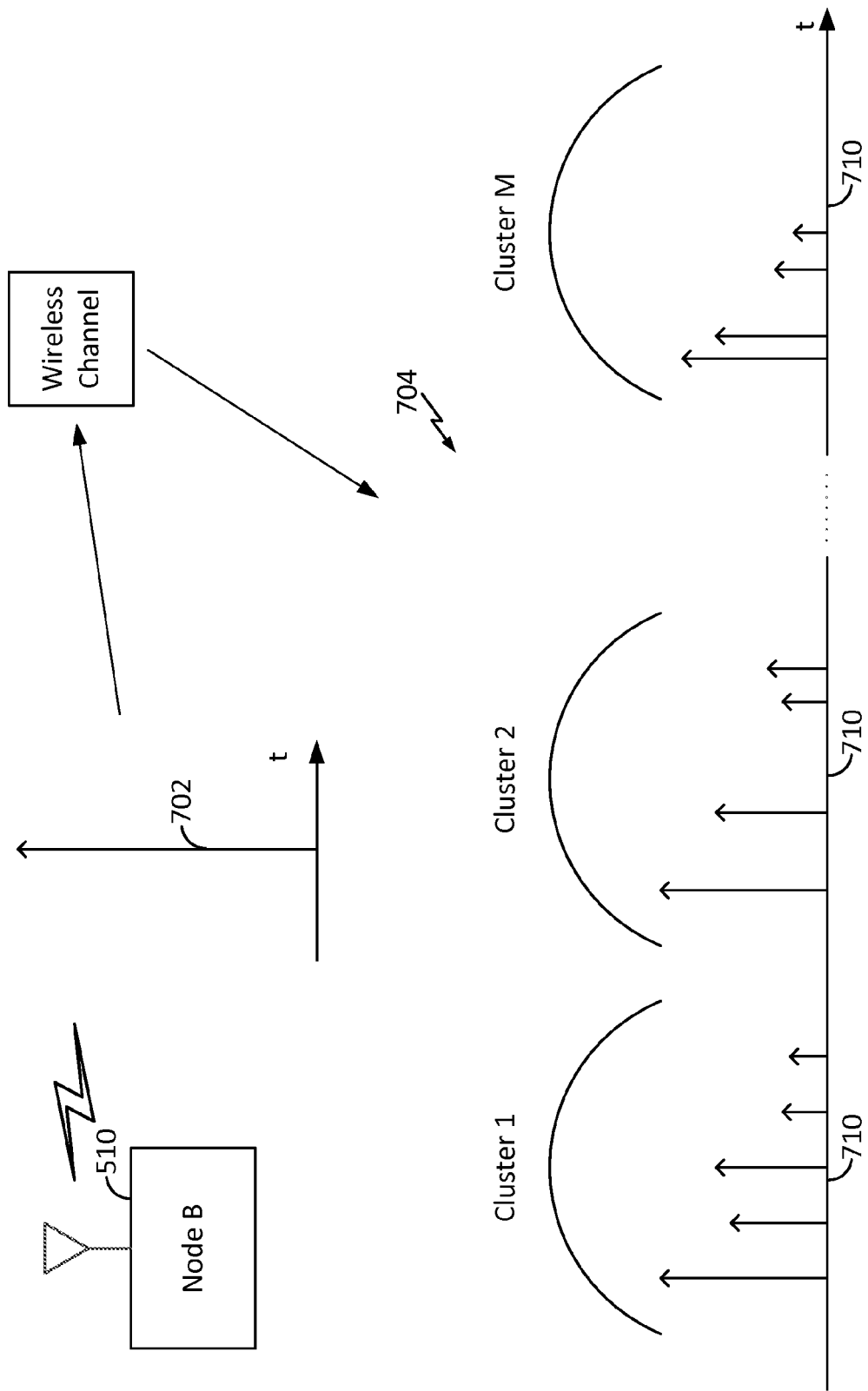
FIG. 7 is a conceptual diagram illustrating the clustering of paths on a downlink multi-path channel in accordance with one example.

FIG. 7 is a schematic illustration of an exemplary separation of a received transmission caused by the multipath channel. In this illustration, Node B 510 transmits a signal represented by the arrow 702. Of course, this is merely a schematic representation, and an actual signal may typically include a plurality of packets, blocks, and/or symbols that extend over a certain nonzero duration of time. As this signal 702 travels through a wireless channel, the signal may be spread out in time as it would be detected by a receiver. For example, as the signal 702 followed one straight path directly from the Node B 702 to a receiver, the receiver would detect signal energy representing that path, while as the signal 702 followed another path that reflected off a wall on its way to the receiver, the receiver would detect signal energy somewhat delayed in time representing that path. Particularly in the case of a wireless channel that includes one or more repeaters, relatively large numbers of paths may exist between the Node B 510 and the receiver, and thus, the receiver may detect a correspondingly large number of peaks in signal energy spread out in time.

At the bottom of FIG. 7 is a chart 704 illustrating the signal energy as it might be received at a receiver 554 within a UE 550 after the signal 702 is spread out by a multipath channel. In this chart 704, the horizontal axis represents time (t), and each arrow represents a path of the multipath channel. As described above, the arrows are merely symbolic, and in a multipath channel, it may be the case that some packets, blocks, or symbols corresponding to two or more of the paths may overlap with one another in time, such that any given window may include some symbols from two or more paths.

As seen in FIG. 7, in accordance with an aspect of the disclosure, these paths may be divided into a plurality of clusters of paths, wherein (in some examples) each cluster 710 may include the same duration in time. In this illustration, the downlink is shown reflecting M clusters, with each cluster labeled Cluster 1 to Cluster M. Here, a cluster is a group or bundle of zero or more physical channel paths, grouped together in accordance with their proximity to one another along the time axis. In some examples, the clusters may represent a partition, evenly dividing the entire received channel into a plurality of clusters; in other examples, it may be desired for the clusters to overlap one another, or to have one or more gaps in time, of the same or of varying durations, between one or more clusters.

By separating the received downlink signal into clusters 710 in this way, an equalizer circuit in a receiver 554 need not have a substantially large equalizer length, as it handles smaller delay spreads, e.g., according to the width of each cluster 710. Here, each cluster 710 can be treated in the same way that a conventional receiver circuit would treat the entire downlink signal received from the Node B 510. That is, as described below, by running an equalizer circuit over M iterations corresponding to each of the M clusters 710, samples from each cluster 710 may be summed up and utilized for further processing, e.g., performing inter-cluster interference cancellation in much the same way as a conventional receiver performs inter-cell interference cancellation.

Figure 8:
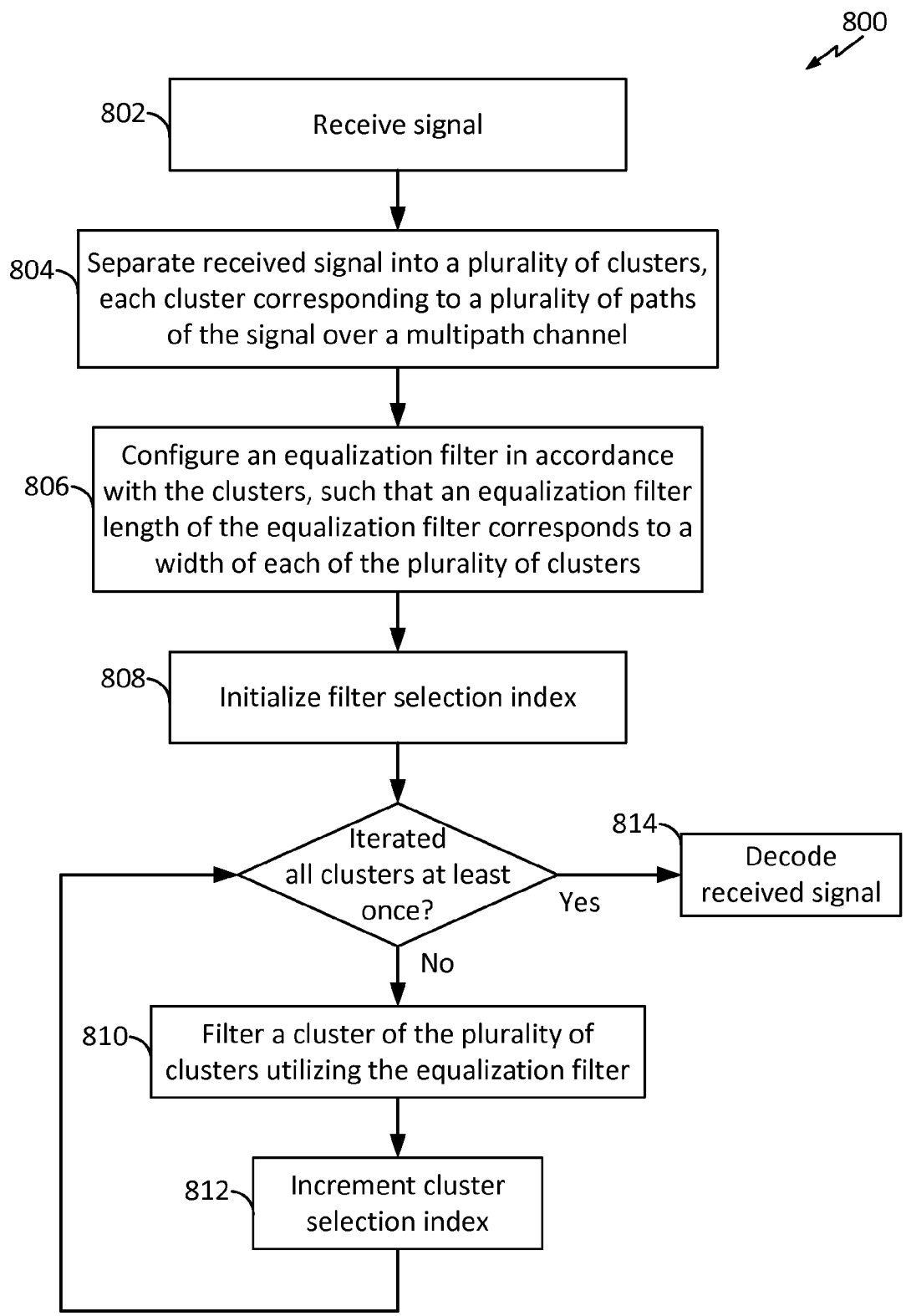
FIG. 8 is a flow chart illustrating a process for implementing an iterative interference cancellation procedure among a plurality of clusters according to one example.

FIG. 8 is a flow chart illustrating an exemplary process 800 for performing iterative inter-cluster interference cancellation in accordance with some aspects of the disclosure. The process 800 may be implemented by the UE 550, e.g., utilizing one or more of the receiver 554, the controller/processor 590, or any other suitable block at the UE 550.

At step 802, the receiver 554 at the UE 550 may receive a signal, e.g., a downlink signal corresponding to a transmission from a source such as the Node B 510. As described above, the incoming signal may be modified from its transmitted form, in accordance with the characteristics of a multipath channel, and the addition of noise and other interference. At step 804, the UE 550 may separate the received signal into a plurality of clusters 710, each cluster corresponding to a plurality of paths of the received signal over the multipath channel. The separation may be performed by the controller/processor 590, e.g., in accordance with suitable processing of samples of the received signal that may be stored at the memory 592. In some examples, the separation may correspond to an equalization filter length of an equalization filter utilized at the receiver 554.

That is, at step 806, the UE 550 may configure the equalization filter in accordance with the clusters 710, such that the equalization filter length of the above-described equalization filter corresponds to a width of at least one of the plurality of clusters 710.

To perform the iterative inter-cluster interference cancellation, a filter selection index may be utilized at the equalization filter, such that the equalization filter may select the corresponding cluster 710 from the stored samples of the received signal. Thus, at step 808 the filter selection index may be initialized, and the iterative inter-cluster interference cancellation loop may begin, for the processing of the received signal by applying the suitably configured equalization filter to each of the plurality of clusters 710. For example, at step 810, the UE 550 may filter a cluster 710 of the plurality of clusters 710 utilizing the configured equalization filter, in accordance with the filter selection index. At step 812, the UE 550 may increment the cluster selection index. This loop can repeat a suitable number of times, in some examples being such that all of the clusters 710 have been processed at least once. When the process determines that a suitable number of iterations of the loop have occurred, the process may end the loop, decoding the processed, received signal at step 814.

Figure 9:
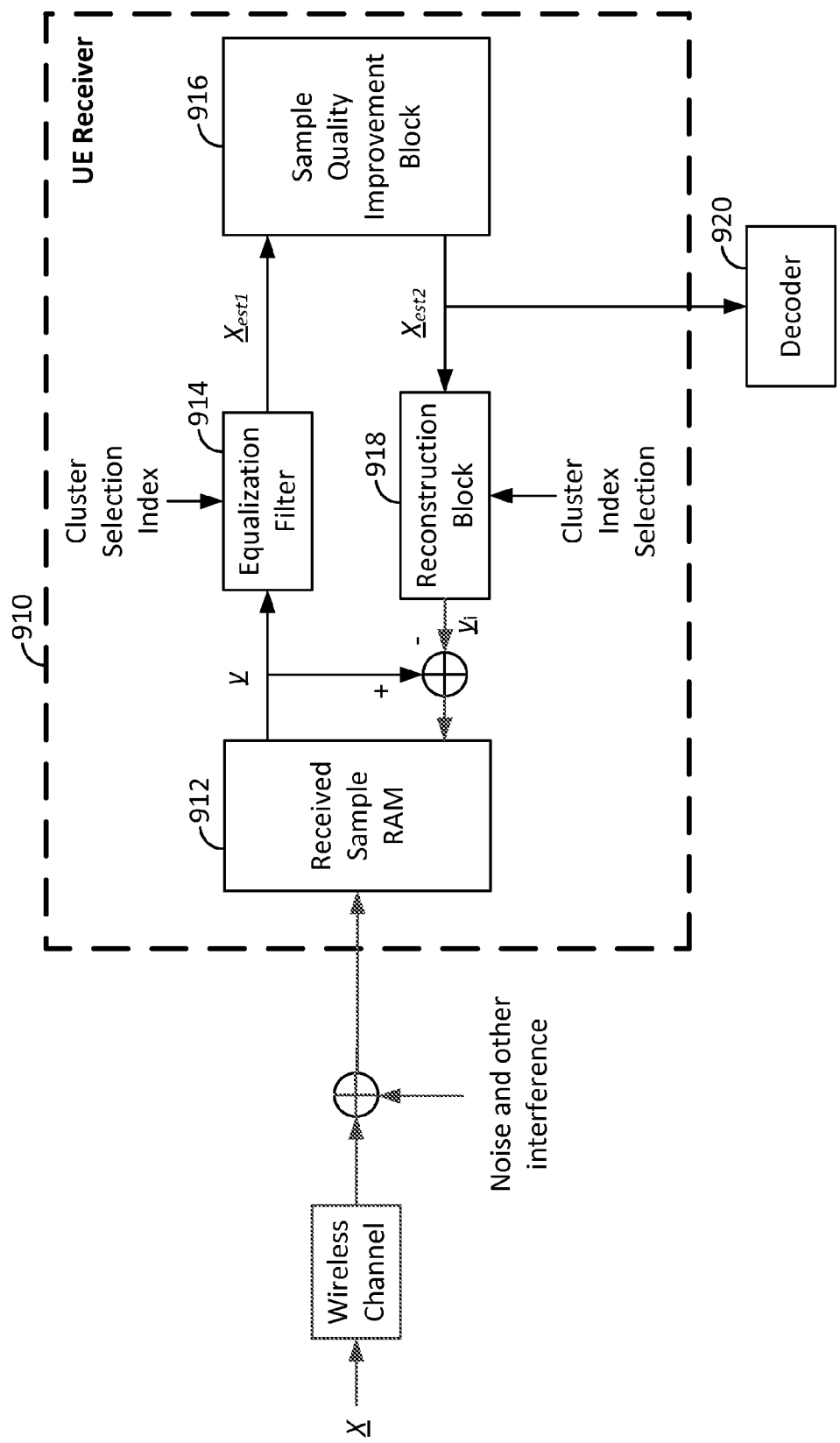
FIG. 9 is a block diagram illustrating a receiver equalizer in accordance with one aspect of the disclosure.

FIG. 9 is a simplified block diagram illustrating some of the components of an exemplary receiver 910 as it might be utilized in the UE 550 according to one aspect of the disclosure, adapted to utilize the clusters 710 described above to recover a downlink multipath signal. In some examples, the receiver 910 may be implemented as, or within, the receiver 554 illustrated in FIG. 5. The illustrated receiver architecture includes memory circuitry 912 such as a random access memory (RAM) configured for temporarily buffering received samples of the received signal; an equalization filter 914 configured for performing equalization upon a selected cluster from among a plurality of clusters as described above and illustrated in FIG. 7; sample quality improvement circuitry 916; and a reconstruction block 918.

In the illustrated example, the blocks within the receiver 910 are configured into a loop, such that the equalization of each cluster 710 may be implemented by the same equalization filter 914 in successive iterations of the loop, with a cluster selection index being incremented upon each iteration. That is, the equalization filter 914 may be configured with suitable equalization filtering operations corresponding to each cluster, to be implemented when the corresponding cluster index is selected and provided to the equalization filter 914. In this way, the equalization filter 914 may be configured to have an equalization filter length corresponding to the delay spread of a single cluster 710, rather than that of the entire delay spread of the incoming signal, enabling reduced cost and complexity relative to a conventional equalization filter capable of handling a signal with such a large delay spread, and improved performance relative to a conventional equalization filter having an equalization filter length equal to that of the equalization filter 914 as utilized herein.

In the illustration of FIG. 9, $\underline{x}$ represents samples of the signal 702 transmitted from the Node B 550, before those samples are affected by the wireless channel, noise, and other interference. After passing through the wireless channel, which may be a multi-path channel, and after being summed with various noise and other interference, the incoming signal is received and sampled by the receiver 910 and samples are stored in the memory 912. When the samples are stored, the receiver 910 may prepare to execute a plurality of iterations, for equalizing signal components corresponding to each of the clusters. For example, a cluster selection index i may be initialized to a value of 1 in one example.

At this time, the samples stored in the memory 912 may be filtered by the equalization filter 814 configured for cluster selection index i, resulting in equalized samples $\underline{x}_{est1}$. The equalized samples $\underline{x}_{est1}$ may then be sent to the sample quality improvement block 916, where the estimation quality (e.g., the signal-to-interference-and-noise ratio) may be further improved, as described in further detail below, by combining with the existing information from previously processed samples in prior iterations. The sample quality improvement block 916 then provides improved estimate samples $\underline{x}_{est2}$ to reconstruction block 918, wherein the contribution of the estimated samples $\underline{x}_{est2}$ from the sample quality improvement block 916 may be reconstructed for cluster i. Thereafter, the contribution of the reconstructed samples $\underline{y}_i$ for cluster i may then be cancelled in the memory 912 by subtracting their contribution as illustrated.

At this time, the cluster selection index i may be incremented, and the above loop may repeat a sufficient number of times (e.g., N times when there exist N clusters) until all cluster indices have been utilized at least once.

In this way, by iterating the operation of the receiver 910 over successive iterations, inter-cluster interference cancellation can be achieved, resulting in a cancellation of self-interference, that is, interference that can negatively affect the received signal, caused by multi-path interference. Upon a sufficient number of iterations (in some examples, after N iterations, corresponding to N clusters), the estimated samples may be sent from the sample quality improvement block 916 to decoder circuitry 920 for decoding and further processing.

With this receiver architecture, the receiver 554 within the UE 510 according to various aspects of the present disclosure need not include a Rake receiver, and further, need not select between the Rake receiver and the equalizer circuit as in a conventional receiver. Moreover, only minor alterations to a conventional equalization filter are needed, such that whereas conventional equalization filters typically function for a cell and are utilized for inter-cell interference cancellation, in an aspect of the disclosure, the equalization filter 914 is configured to function for a cluster of signal paths, and is utilized for inter-cluster interference cancellation. Thus, because of the relatively small changes to the conventional equalization circuitry, and the removal of the Rake receiver, the overall modem implementation complexity may be substantially simplified.

Figure 10:
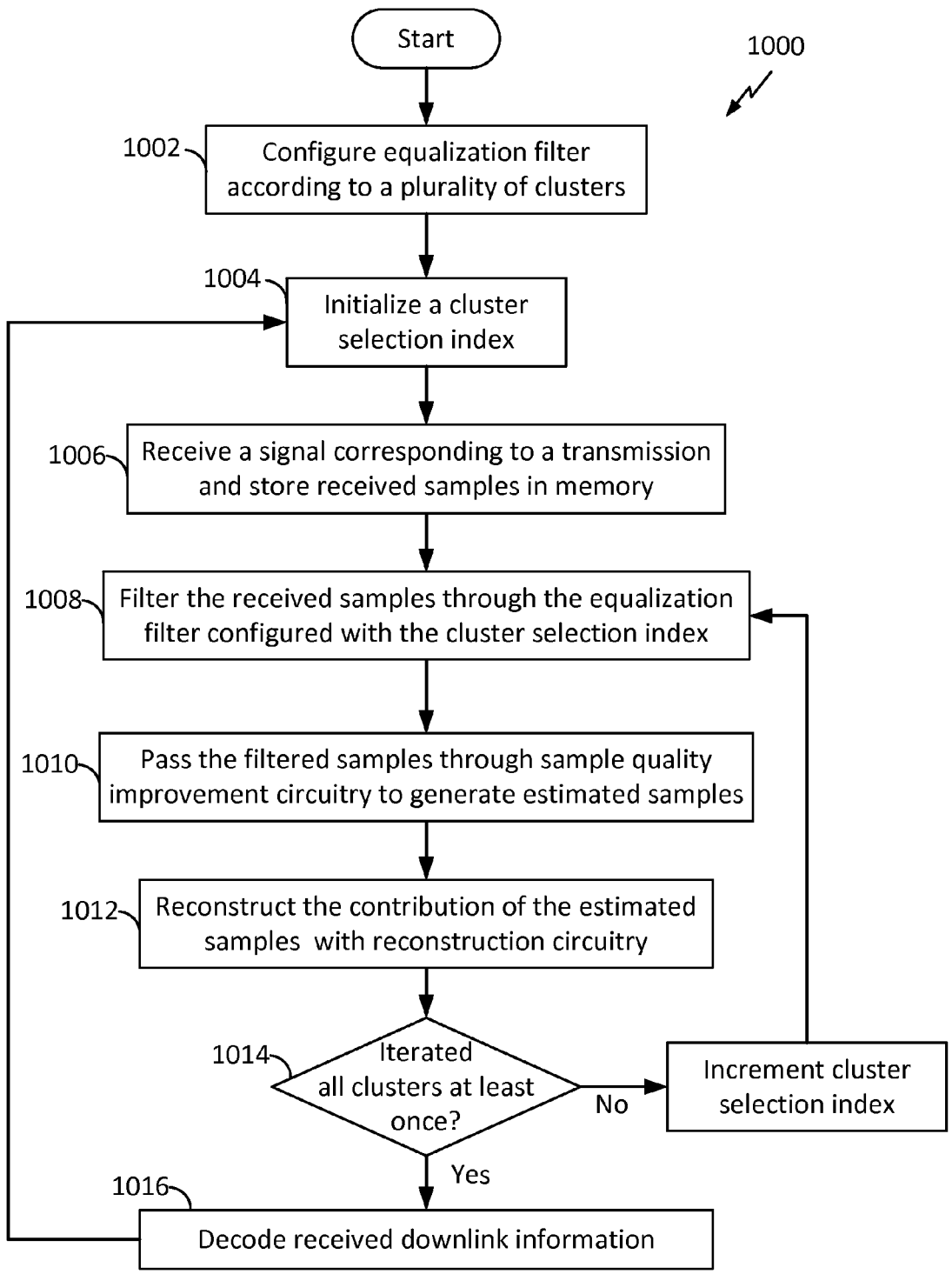
FIG. 10 is a flow chart illustrating a process for implementing an iterative interference cancellation procedure among a plurality of clusters according to one example utilizing the receiver of FIG. 9.

FIG. 10 is a flow chart illustrating a process 1000 for implementing an iterative interference cancellation procedure in accordance with one aspect of the disclosed approach. In the discussion that follows, reference will be made to the receiver 910 described above and illustrated in FIG. 9; however, those of ordinary skill in the art will comprehend that a process for implementing an iterative interference cancellation procedure utilizing the receiver Error! Reference source not found.10 (described below) would be in many ways the same, with differences relating to the difference in architecture being straightforward and within the scope of the present disclosure and the claims that follow.

At step 1002, the receiver 910 may configure the equalization filter 914 according to a plurality of clusters 710, e.g., by determining separation of the transmission by the multipath wireless channel, and configuring clusters 710 to correspond to respective subsets of the multiple paths. At step 1004, a cluster selection index may be initialized for the equalization filter 914.

At step 1006, the receiver 910 may receive a signal corresponding to a multipath transmission, and store samples of the received transmission in memory, e.g., at the received sample RAM 912. At step 1008, the stored samples may be filtered through the equalization filter 914, configured according to the cluster selection index as described above. At step 1010, the filtered samples may be passed through sample quality improvement circuitry 916 in order to generate estimated samples, and at step 1012 the process may reconstruct the contribution of the estimated samples with reconstruction circuitry 918.

At step 1014, the process may determine whether all clusters 710 have been iterated at least once. If not, the cluster selection index may be incremented, and the process may return to step 1008, described above. If all clusters 710 have iterated at least once, the process may proceed to step 1016 and decode the received downlink information.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A receiver configured for wireless communication, comprising:
   a memory configured for storing samples of a received signal; and
   an equalization filter configured to use a cluster selection index for selecting and filtering at least a portion of the stored samples of the received signal in accordance with a separation of the received signal into a plurality of clusters by, for each cluster:
      selecting the cluster from among the plurality of clusters that corresponds to the cluster selection index;
      filtering the selected cluster that corresponds to the cluster selection index; and
      incrementing the cluster selection index, wherein each cluster corresponds to a plurality of paths of a multipath channel experienced by the received signal from a source, and wherein each cluster of the plurality of clusters is filtered by the same equalization filter.

2. The receiver of claim 1, further comprising:
   a reconstruction circuit for reconstructing a contribution of samples corresponding to at least one cluster from among the plurality of clusters; and
   a subtraction circuit for subtracting the contribution of samples corresponding to the at least one cluster from the stored samples of the received signal.

3. A method of wireless communication, comprising:
   receiving a signal corresponding to a transmission from a source;
   separating the received signal into a plurality of clusters, each cluster corresponding to a plurality of paths of a multipath channel experienced by the received signal from the source;
   configuring an equalization filter in accordance with the clusters, such that an equalization filter length of the equalization filter corresponds to a width of at least one of the plurality of clusters; and
   processing the received signal using a cluster selection index to apply the equalization filter to each of the plurality of clusters by, for each cluster:
      selecting the cluster from among the plurality of clusters that corresponds to the cluster selection index;
      applying the equalization filter to the selected cluster that corresponds to the cluster selection index; and incrementing the cluster selection index, wherein the same equalization filter is applied to each of the plurality of clusters.

4. The method of claim 3, wherein the processing of the received signal comprises performing inter-cluster interference cancellation among the plurality of clusters.

5. A receiver configured for wireless communication, comprising:
means for storing samples of a received signal; and
means for using a cluster selection index to select and to filter at least a portion of the stored samples of the received signal in accordance with a separation of the received signal into a plurality of clusters by, for each cluster:
selecting the cluster from among the plurality of clusters that corresponds to the cluster selection index;
filtering the selected cluster that corresponds to the cluster selection index using an equalization filter; and
incrementing the cluster selection index, wherein each cluster corresponds to a plurality of paths of a multipath channel experienced by the received signal from a source, and wherein each cluster of the plurality of clusters is filtered by the same equalization filter.

6. The receiver of claim 5, further comprising:
means for reconstructing a contribution of samples corresponding to at least one cluster from among the plurality of clusters; and
means for subtracting the contribution of samples corresponding to the at least one cluster from the stored samples of the received signal.

7. A method of wireless communication, comprising:
means for receiving a signal corresponding to a transmission from a source;
means for separating the received signal into a plurality of clusters, each cluster corresponding to a plurality of paths of a multipath channel experienced by the received signal from the source;
means for configuring an equalization filter in accordance with the clusters, such that an equalization filter length of the equalization filter corresponds to a width of at least one of the plurality of clusters; and
means for processing the received signal using a cluster selection index to apply the equalization filter to each of the plurality of clusters by, for each cluster:
selecting the cluster from among the plurality of clusters that corresponds to the cluster selection index;
applying the equalization filter to the selected cluster that corresponds to the cluster selection index; and
incrementing the cluster selection index, wherein the same equalization filter is applied to each of the plurality of clusters.

8. A computer-readable storage medium operable at a receiving device, comprising instructions for causing a computer to:
store samples of a received signal; and
use a cluster selection index to filter at least a portion of the stored samples of the received signal in accordance with a separation of the received signal into a plurality of clusters by, for each cluster:
selecting the cluster from among the plurality of clusters that corresponds to the cluster selection index;
applying an equalization filter to the selected cluster that corresponds to the cluster selection index; and
incrementing the cluster selection index, wherein each cluster corresponds to a plurality of paths of a multipath channel experienced by the received signal from a source, wherein each cluster of the plurality of clusters is filtered by the same equalization filter.

9. The method of claim 8, wherein the means for processing the received signal is configured to perform inter-cluster interference cancellation among the plurality of clusters.

10. The computer-readable storage medium of claim 8, further comprising instructions for causing a computer to:
reconstruct a contribution of samples corresponding to at least one cluster from among the plurality of clusters; and
subtract the contribution of samples corresponding to the at least one cluster from the stored samples of the received signal.

11. A computer-readable storage medium comprising instructions for causing a computer to:
receive a signal corresponding to a transmission from a source;
separate the received signal into a plurality of clusters, each cluster corresponding to a plurality of paths of a multipath channel experienced by the received signal from the source;
configure an equalization filter in accordance with the clusters, such that an equalization filter length of the equalization filter corresponds to a width of at least one of the plurality of clusters; and
process the received signal using a cluster selection index to apply the equalization filter to each of the plurality of clusters by, for each cluster:
selecting the cluster from among the plurality of clusters that corresponds to the cluster selection index;
applying the equalization filter to the selected cluster that corresponds to the cluster selection index; and
incrementing the cluster selection index, wherein the same equalization filter is applied to each of the plurality of clusters.

12. The computer-readable storage medium of claim 11, wherein the instructions for causing a computer to process the received signal are further configured to cause a computer to perform inter-cluster interference cancellation among the plurality of clusters.

13. A receiver configured for wireless communication, comprising:
at least one processor;
a memory communicatively coupled to the at least one processor; and
a communication interface communicatively coupled to the at least one processor, wherein the at least one processor is configured to:
receive a signal corresponding to a transmission from a source;
separate the received signal into a plurality of clusters, each cluster corresponding to a plurality of paths of a multipath channel experienced by the received signal from the source;
configure an equalization filter in accordance with the clusters, such that an equalization filter length of the equalization filter corresponds to a width of at least one of the plurality of clusters; and
process the received signal using a cluster selection index to apply the equalization filter to each of the plurality of clusters by, for each cluster:
selecting the cluster from among the plurality of clusters that corresponds to the cluster selection index;
applying the equalization filter to the selected cluster that corresponds to the cluster selection index; and incrementing the cluster selection index, wherein the same equalization filter is applied to each of the plurality of clusters.

14. The receiver of claim 13, wherein the at least one processor, being configured to process the received signal, is further configured to perform inter-cluster interference cancellation among the plurality of clusters.

15. The method of claim 1, wherein one or more clusters of the plurality of clusters are overlapping clusters.

* * * * *